Patented Oct. 22, 1935

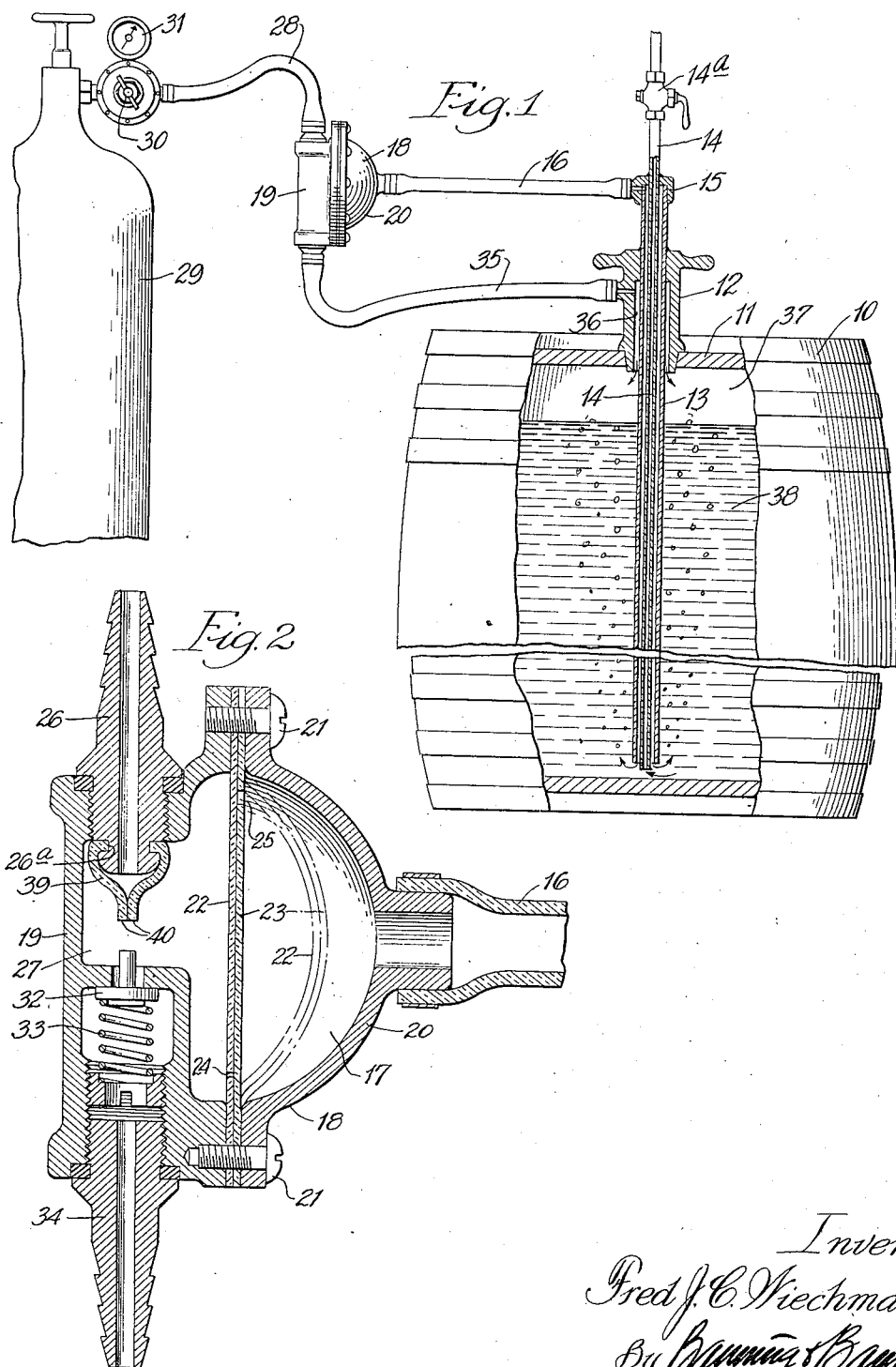

2,017,879

UNITED STATES PATENT OFFICE 2,017,879

APPARATUS FOR CARBONATING BEER OR OTHER BEVERAGES

Fred J. C. Wiechmann, Maywood, Ill.

Application September 24, 1934, Serial No. 745,272

7 Claims. (Cl. 225—17)

An object of this invention is to provide a means for automatically supplying a small stream of carbon dioxide to a quantity of beer or other carbonated beverage below its surface so as to keep the beer carbonated, said stream steadily building up pressure sufficient for the withdrawal of beer at a slow rate, together with means for supplying to the space above the surface of the beer carbon dioxide at a much faster rate when the beer is more rapidly withdrawn.

This and other objects, as will hereinafter appear, are accomplished by this invention which is fully described in the following specification, and shown in the accompanying drawing, in which—

Figure 1 is a side elevation of a beer barrel partly in section with an embodiment of my invention applied thereto; and Fig. 2 is an enlarged vertical section through the automatic valve.

The embodiment illustrated comprises a beer barrel 10, or the like, having a head 11 into which is inserted a fitting 12 which carries a tube 13 extending to a point near the bottom of the barrel and loosely enclosing a pipe 14 which preferably extends slightly below the bottom of the tube 13. The top of the tube 13 extends above the fitting 12, and has a cap 15 tightly secured thereto, the cap having a lateral nipple over which is secured a piece of tubing 16, the opposite end of the tubing leading to a chamber 17 in an automatic valve assembly 18 which will later be described. The pipe 14 extends up through the cap 15 to which it is firmly secured so as to prevent the leakage of gas, the pipe leading to a spigot (not shown) from which beer may be withdrawn, the pipe 14 preferably having a valve 14ª located near the barrel for control at that point.

The automatic valve assembly 18 is made up of two castings 19 and 20 which are secured together by means of screws 21. Between these castings are placed two rubber diaphragms 22, 23, the former having a tiny hole 24 therein, and the latter having a larger hole 25, these holes being preferably placed at opposite portions of the diaphragms for a purpose which will later be explained. A nipple connection 26 is provided for the chamber 27 within the casting 19 and connects through a hose 28 with a carbon dioxide tank 29, through a control valve 30 which is well known in this art. A gauge 31 shows the amount of pressure supplied to the chamber 27.

A valve 32 normally held closed by means of a spring 33 closes communication between the chamber 27 and a hose coupling 34 which connects through a hose 35 with the space 36 within the fitting 12, this space communicating directly with the space 37 above the beer 38 in the barrel. Thus it will be seen that when the valve 30 is slightly opened carbon dioxide from the tank will pass through the hose 28, and will tend to move the diaphragm from the full line positions 22, 23 to the dotted line positions. A small amount of this gas will leak through the hole 24 and will pass between the two diaphragms, thence out through the hole 25 and the hose 16 to the space between the tube 13 and the pipe 14. This gas will then pass down until it reaches the end of the tube 13 when it will bubble up through the beer as shown. Some of this carbon dioxide will be absorbed by the beer, and some of it will pass up through the beer as bubbles, thereby increasing the pressure on the surface of the beer.

Thus when the beer is slowly withdrawn through the pipe 14, the pressure thus generated will be sufficient to maintain the necessary pressure on the surface of the beer. A more rapid withdrawal of beer, however, will cause the pressure of gases in the space 37 to drop to a point where the back pressure through the hose 35 on the valve 32 will be sufficient to cause the pressure in the chamber 27 to force the valve 32 off its seat, thereby allowing carbon dioxide from the chamber 27 to pass rapidly to the space 37 in the barrel. Thus it will be seen that a very simple and efficient means is provided for keeping a small but constant stream of carbon dioxide passing through the beer in the barrel following each withdrawal of beer so as to maintain it carbonated, whereby the equality of the last of the beer issuing from the barrel is substantially the same as the first which came from the barrel. The gas will continue to flow into the barrel through the bleeder valve 22, or the valve 27, or both, until the pressure within the barrel reaches a predetermined degree when the flow will cease until the pressure in the barrel again drops due to withdrawal of beer or to leakage.

In order to prevent beer or other carbonated beverage from backing up into the valve assembly 18, or beyond, I have provided check valves in the hoses 16, 28 and 35. The check valve in the hose line 28 is shown in Fig. 2 and consists of a rubber valve 39 having an opening consisting of two flat lines 40, the valve being adapted to fit a necked-in portion 26ª at the lower end of the nipple 26.

It will be understood that the term "beer" as used throughout the specification and claims is intended to include all carborated beverages.

I claim:

1. In combination, a beer barrel, a tube extending thereinto, a source of carbon dioxide under pressure, means connected to said source for delivering a small but substantially constant stream of carbon dioxide to the beer following withdrawal of the beer beneath its surface through the tube so as to keep the beer carbonated and to build up a pressure on the surface of the beer sufficient for slow withdrawals thereof, and means connected to said source for supplying carbon dioxide to the surface of the beer much more rapidly for rapid withdrawal thereof.

2. In combination, a beer barrel, a tube extending thereinto, a source of carbon dioxide under pressure, means including a slow leak connected to said source for delivering a small but substantially constant stream of carbon dioxide to the beer following withdrawal of the beer beneath its surface through the tube so as to keep the beer carbonated and to build up a pressure on the surface of the beer sufficient for slow withdrawals thereof, and means connected to said source for supplying carbon dioxide to the surface of the beer much more rapidly for rapid withdrawal thereof.

3. In combination, a beer barrel, a tube extending thereinto, a source of carbon dioxide under pressure, means including two diaphragms in contact, said diaphragms having holes therethrough spaced apart, said means being connected to said source for delivering a small but substantially constant stream of carbon dioxide to the beer following withdrawal thereof beneath its surface through the tube so as to keep the beer carbonated and to build up a pressure on the surface of the beer sufficient for slow withdrawals thereof, and means connected to said source for supplying carbon dioxide to the surface of the beer much more rapidly for rapid withdrawal thereof.

4. In combination, a beer barrel, a tube extending thereinto, a source of carbon dioxide under pressure, means including two diaphragms in contact, said diaphragms having holes therethrough spaced apart, said means being connected to said source for delivering a small but substantially constant stream of carbon dioxide to the beer following withdrawal thereof beneath its surface through the tube so as to keep the beer carbonated and to build up a pressure on the surface of the beer sufficient for slow withdrawals thereof, and a pressure operated valve connected to said source for supplying carbon dioxide to the surface of the beer much more rapidly for rapid withdrawal thereof.

5. Apparatus for carbonating beverages comprising a tube adapted to extend into a gas-tight container containing the beverage to be carbonated, a fitting surrounding the tube and adapted to fit snugly into an opening in the top of the container, a pipe for withdrawing the beverage, a gas-controlling device having a chamber in which is an inlet adapted for connection to a source of carbonic acid gas pressure, an outlet adapted to be connected to the fitting so as to deliver carbonic acid gas to the top of the container at a point above the level of a beverage therein, a pressure operated valve in the outlet, and means for slowly passing gas from the chamber to the tube for carbonating the beverage.

6. Apparatus for carbonating beverages comprising a tube adapted to extend into a gas-tight container containing the beverage to be carbonated, a fitting surrounding the tube and adapted to fit snugly into an opening in the top of the container, a pipe for withdrawing the beverage, the pipe extending through the tube, a gas-controlling device having a chamber in which is an inlet adapted for connection to a source of carbonic acid gas pressure, an outlet adapted to be connected to the fitting so as to deliver carbonic acid gas to the top of the container at a point above the level of a beverage therein, a pressure operated valve in the outlet, and means for slowly passing gas from the chamber to the tube for carbonating the beverage.

7. Apparatus for carbonating beverages comprising a tube adapted to extend into a gas-tight container containing the beverage to be carbonated, a fitting surrounding the tube and adapted to fit snugly into an opening in the top of the container, a pipe for withdrawing the beverage, a gas-controlling device having a chamber in which is an inlet adapted for connection to a source of carbonic acid gas pressure, an outlet adapted to be connected to the fitting so as to deliver carbonic acid gas to the top of the container at a point above the level of a beverage therein, a pressure operated valve in the outlet, and means including two diaphragms in contact, each diaphragm having a hole therein, the holes being spaced from each other for slowly passing gas from the chamber to the tube for carbonating the beverage.

FRED J. C. WIECHMANN.